Patented Oct. 11, 1938

2,132,884

UNITED STATES PATENT OFFICE 2,132,884

CELLULOSE ORGANIC ESTER COMPOSITION CONTAINING A BUTYL-P-TOLUENE SULPHONAMIDE

Henry B. Smith, Rochester, N. Y., assignor, by mesne assignments, to Eastman Kodak Company, Jersey City, N. J., a corporation of New Jersey No Drawing. Application May 31, 1934, Serial No. 728,390

14 Claims. (Cl. 106—40)

This invention relates to compositions of matter in which an organic ester of cellulose, such, for instance, as cellulose acetate, is combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, artificial silk, varnishes or lacquers, and the like.

One object of this invention is to produce compositions of matter which may be made into permanently transparent, strong and flexible sheets or film of desired thinness which are substantially waterproof, are unaffected by ordinary photographic fluids and possess the desired properties of a support for sensitive photographic coatings. Another object of my invention is to produce compositions which will not injure, or be injured by, the substances or surfaces with which they are associated during manufacture. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

One of the plasticizers which has been used with cellulose acetate is ethyl p-toluene sulphonamide. While it gives good initial flexibility to cellulose acetate films, films containing this plasticizer do not maintain their flexibility over long periods of time, and hence are not entirely satisfactory. I have discovered, however, that two related compounds, namely, n-butyl p-toluene sulphonamide and di-n-butyl p-toluene sulphonamide, have greatly superior properties as plasticizers for cellulose acetate and other cellulose organic esters. They confer on cellulose acetate films, for example, initial flexibilities comparable with those conferred by ethyl p-toluene sulphonamide, but whereas cellulose acetate films plasticized with 20% of ethyl p-toluene sulphonamide became brittle within 30 days when kept at 65° C., films plasticized with only 10% of di-n-butyl p-toluene sulphonamide or with from 10% to 50% (parts by weight based on the cellulose acetate) of n-butyl p-toluene sulphonamide maintained flexibility for 198 days at 65° C.—at least a 650% increase in flexible life of the film—thus indicating that they will withstand ordinary usage satisfactorily for many years.

n-butyl p-toluene sulphonamide has the structural formula

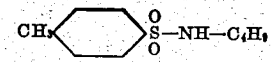

and is a new compound. It may be prepared as follows: 219 g. (3 g.-mols) of n-butyl amine is placed in a 3-liter flask together with one liter of water, one kg. of benzene, and 600 g. (6 g.-mols) of 40% sodium hydroxide solution. 571.5 g. (3 g.-mols) of p-toluene sulphone chloride is added very slowly, with constant stirring. Two or three hours after the completion of the reaction, the mixture is carefully acidified with glacial acetic acid. The benzene layer, which contains the product, is separated and vacuum distilled. The fraction boiling at 233–234° C. at 20 mm. pressure is collected, poured into 250 g. of ligroin, and cooled in an ice-salt bath. n-butyl p-toluene sulphonamide is obtained as white crystals, which are filtered off on a Buchner funnel. The compound melts at 41–42.5° C., and is very soluble in methanol and in 20% sodium hydroxide solution, but insoluble in ligroin.

Di-n-butyl p-toluene sulphonamide has the structural formula

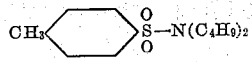

and is a new compound. It may be prepared as follows: 285 g. (2 g.-mols) of di-n-butyl amine is placed in a 3-liter flask with one liter of water, one kg. of benzene, and 200 g. (2 g.-mols) of 40% sodium hydroxide. To this mixture, 381 g. (2g.-mols) of p-toluene sulphone chloride is added slowly, with constant stirring, over a period of from two to three hours. When the reaction is complete, the water layer is made slightly acid to litmus paper with glacial acetic acid, and separated from the benzene layer, which contains the product. The benzene is distilled off, and the di-n-butyl p-toluene sulphonamide is distilled under reduced pressure. It boils at 233–234° C. at 20 mm. pressure. It is very soluble in ligroin, carbon tetrachloride, chloroform, and methanol.

In order that those skilled in this art may better understand my invention, I would state, by way of illustration, that for the manufacture of photographic film base or other sheets, my new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to 50 parts by weight of n-butyl p-toluene sulphonamide or 10 parts by weight of di-n-butyl p-toluene sulphonamide. Within the limits stated, the amount of plasticizer may be decreased or increased, depending upon whether it is desired to decrease or increase, respectively, the properties which the compound contributes to the finished product. The amount of solvent employed may also be increased or decreased, depending upon whether it is desired to have a more or less freely flowing composition, respectively. Compositions of matter so prepared may be deposited upon any suitable film-forming surface to form films or sheets, in a manner well known to those skilled in the art. Films so produced have permanently brilliant transparency, and are tough as well as flexible.

Other similar solvents (instead of acetone) which are compatible with the cellulose acetate and my new plasticizers may also occur to those skilled in this art, such, for instance, as ethylene chloride-alcohol mixtures. In like manner these plasticizers may be compounded with other single organic esters of cellulose, such as cellulose propionate, butyrate and the like, or with mixed organic esters, such as cellulose aceto-stearate, cellulose aceto-propionate, or cellulose aceto-malate, a suitable solvent which will dissolve both the cellulose derivative and the plasticizer being employed.

Inasmuch as my above-described compositions of matter are useful in the production of films and sheets, it will be apparent that my new plasticizers may also be employed with advantage in the other branches of the plastic art. It may be desired to employ compositions of different viscosity or evaporation characteristics, but this is a mere matter of changing the solvent proportion or adding evaporation retardents or other high or medium-boiling constituents, as has been well known in the art for more than a decade. My novel plasticizers may be employed with advantage in connection with a number of the known lacquer and varnish formulae with which they may be found to be compatible. In such cases the plasticizer is usually first put into solution with the cellulose derivative solution, and if non-solvents are added for the purpose of cheapening the composition, they are added only to such an extent as will not precipitate the derivative from solution. Other uses within the scope of my invention will also suggest themselves to those skilled in the art and are to be included within the scope of the appended claims.

What I claim as my invention and desire to be secured by Letters Patent of the United States is:

1. A composition of matter comprising a cellulose organic acid ester and as a plasticizer therefor a butyl p-toluene sulphonamide.
2. A composition of matter comprising cellulose acetate and as a plasticizer therefor a butyl p-toluene sulphonamide.
3. A composition of matter comprising cellulose acetate and as a plasticizer therefor n-butyl p-toluene sulphonamide.
4. A composition of matter comprising cellulose acetate and as a plasticizer therefor di-n-butyl p-toluene sulphonamide.
5. A composition of matter comprising 100 parts of cellulose acetate and as a plasticizer therefor about 10 to 50 parts, by weight, of n-butyl p-toluene sulphonamide.
6. A composition of matter comprising 100 parts of cellulose acetate and as a plasticizer therefor about 10 parts, by weight, of di-n-butyl p-toluene sulphonamide.
7. A transparent, flexible sheet comprising a cellulose organic acid ester and, as a plasticizer therefor, a butyl p-toluene sulphonamide.
8. A transparent, flexible sheet comprising cellulose acetate and, as a plasticizer therefor, a butyl p-toluene sulphonamide.
9. A transparent, flexible sheet comprising 100 parts of cellulose acetate and, as a plasticizer therefor, about 10 to 50 parts, by weight, of n-butyl p-toluene sulphonamide.
10. A transparent, flexible sheet comprising 100 parts of cellulose acetate and, as a plasticizer therefor, about 10 parts, by weight, of di-n-butyl p-toluene sulphonamide.
11. A new composition of matter comprising a cellulose derivative base and a butyl p-toluene sulphonamide.
12. A composition of matter comprising cellulose acetate and a monobutyl p-toluene sulphonamide.
13. A composition of matter comprising 100 parts of cellulose acetate and about 10 to 50 parts, by weight, of a monobutyl p-toluene sulphonamide.
14. A transparent, flexible sheet comprising 100 parts of cellulose acetate and, as a plasticizer therefor, about 10 to 50 parts, by weight, of a monobutyl p-toluene sulphonamide.

HENRY B. SMITH.

CERTIFICATE OF CORRECTION.

Patent No. 2,132,884.  October 11, 1938.

HENRY B. SMITH.

It is hereby certified that error appears in the printed specification of the above numbered patent requiring correction as follows: Page 2, first column, line 14, for the numeral "285" read 258; and that the said Letters Patent should be read with this correction therein that the same may conform to the record of the case in the Patent Office.

Signed and sealed this 6th day of December, A. D. 1938.

Henry Van Arsdale (Seal)  Acting Commissioner of Patents.